(No Model.)
E. AZE.
CRANK HANGER BEARING FOR BICYCLES.
No. 573,634. Patented Dec. 22, 1896.
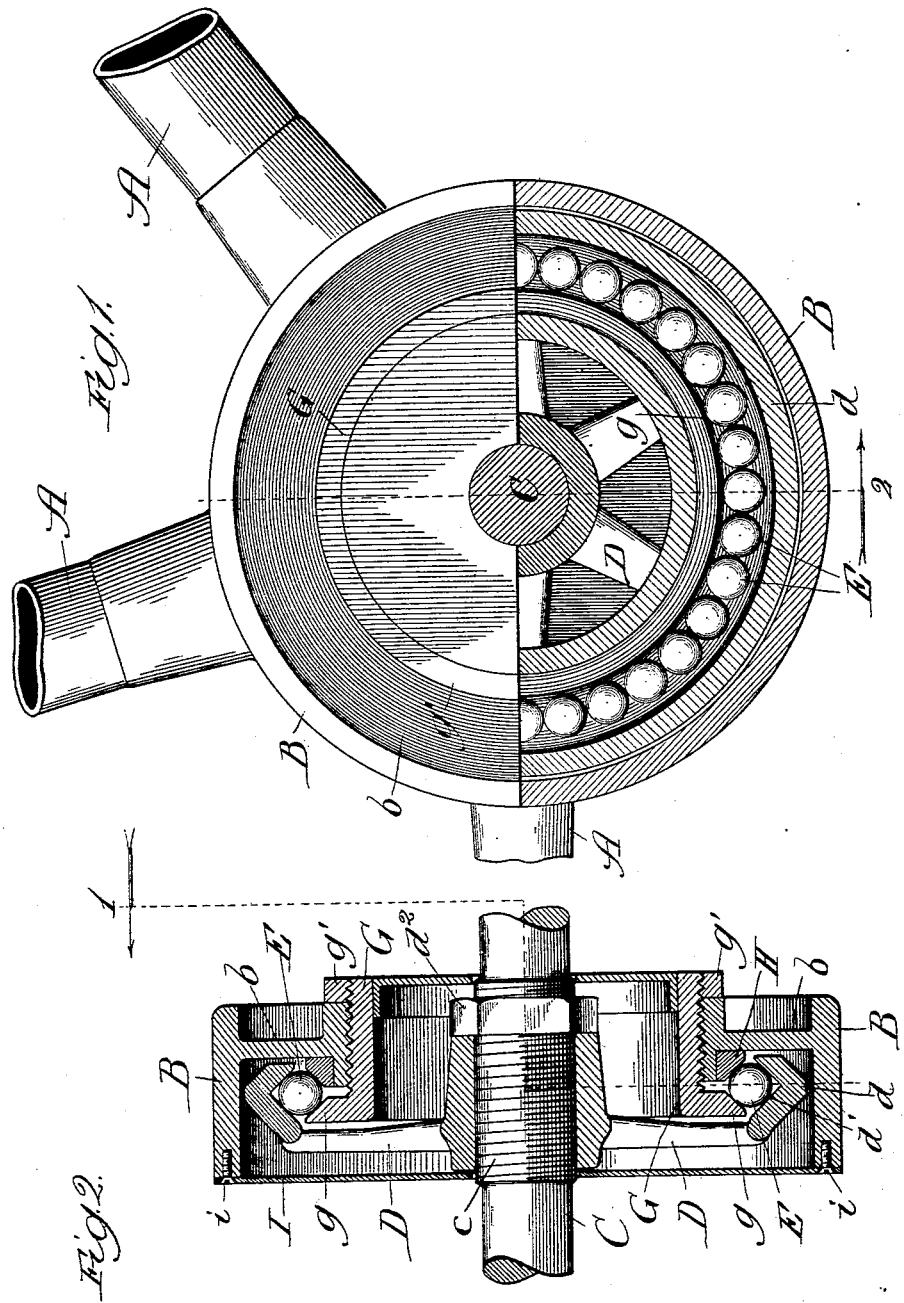
Witnesses:
Inventor:
Emile Aze.

UNITED STATES PATENT OFFICE.

EMILE AZE, OF CHICAGO, ILLINOIS, ASSIGNOR, BY MESNE ASSIGNMENTS, OF ONE-HALF TO FRANK THOMAS FOWLER, OF SAME PLACE.

CRANK-HANGER BEARING FOR BICYCLES.

SPECIFICATION forming part of Letters Patent No. 573,634, dated December 22, 1896.

Application filed March 13, 1896. Serial No. 583,049. (No model.)

*To all whom it may concern:*

Be it known that I, EMILE AZE, a citizen of the United States, residing at Chicago, Cook county, Illinois, have invented certain new and useful Improvements in Crank-Hanger Bearings for Bicycles, of which the following is a specification.

My invention relates particularly to ball-bearings as used in connection with safety-bicycles, being especially applicable to the crank-shaft, or what is known in the art as the "crank-hanger."

The object of my invention is to provide a simple, economical, and efficient bearing for the crank-shaft of a bicycle, one that will occupy the least amount of space longitudinally, so as to admit of a "narrow tread" for the pedals; and the invention consists in the features, combinations, and details of construction hereinafter described and claimed.

In the accompanying drawings, Figure 1 is a side elevation, partly in section, taken in line 1 of Fig. 2, showing the crank-hanger of a bicycle and a small portion of the bicycle-frame; and Fig. 2, a transverse section taken on line 2 of Fig. 1.

In the art to which this invention relates it is well known that it is desirable to have what is known as a "narrow-tread" wheel, or a wheel in which the pedals are brought as close together as possible, so that the rider will occupy a perfectly upright position—that is, the feet will occupy about the same position as in walking. In order to accomplish this, it is desirable to have as narrow a bearing as possible in the crank-hanger, and it is necessary that provision be made for taking up the loose play, so as to prevent wabbling.

In illustrating and describing my improvements I have only illustrated and described that portion of the wheel that is necessary to a complete understanding of my invention—viz., the crank-hanger and attached parts. The others being well known in the art need no further description.

In constructing a bicycle equipped with my improvements I make the usual frame, a portion of which is shown in the drawings and marked A. To this is secured a casing B, which forms the crank-hanger. In this casing I rotatably mount the crank-shaft C, having a threaded portion $c$, upon which is mounted a disk or wheel D. This disk or wheel is provided with an outer V-shaped circumferential rim $d$, having therein an internal V-shaped groove $d'$. This disk is, as above specified, screw-threaded on the crank-shaft and held in the desired position by means of a lock-nut $d^2$. This V-shaped groove in the disk or wheel forms one portion of the bearing-groove, in which I mount a set of antifriction-balls E. In order to form and complete the rest of this bearing-groove, I provide what I term an "adjusting-nut" G, having a threaded portion and mounted in a threaded axial opening in the hanger portion. This adjusting nut or disk has an outwardly-extending flange portion which forms a bearing portion $g$, arranged inside of the rotatable disk, as shown in Fig. 2, to form one portion of the inner V-shaped bearing-groove. The hanger portion is provided with a flange or rim $b$, extending inwardly, and upon which I mount a circular ring H, that is tightly fitted thereon, so as to be practically prevented from rotary motion, and which completes, with the other parts above mentioned, the bearing-groove. I then provide a lock-nut $g'$ on the projecting threaded portion of the adjusting-nut, so as to position the same after the desired freedom has been given to the antifriction-balls.

I prefer to inclose the hanger at its side, and thus protect it from dust, dirt, &c., by means of caps or dust-covers I, such as are shown to the left of Fig. 2, and which are secured to the hanger by means of screws $i$. In assembling the parts the circular ring H is first put in place, although, if desired, this portion may be made a part of the hanger.

The advantages of my construction are that the balls being comparatively a considerable distance from the center prevent any wabbling, and the loose play in the bearing may be taken up by adjusting the nut $g'$ in the desired position, which can be easily performed from the outside without taking the mechanism apart.

I claim—

1. In a crank-hanger bearing for bicycles, the combination of a crank-shaft, a disk on such crank-shaft having an internal V-shaped groove therein, an adjusting nut or disk screw-threaded in the hanger portion with its bearing portion arranged inside of the disk and forming one part of the inner V-shaped bearing-groove, a third portion in such hanger with a portion arranged inside the disk and forming the rest of the inner V-shaped bearing-groove, and a series of antifriction-balls in such bearing, substantially as described.

2. In a crank-hanger for bicycles, the combination of a crank-shaft having a threaded portion, a disk on the threaded portion of such crank-shaft provided with an internal V-shaped bearing-groove, an adjusting nut or disk screw-threaded in the hanger portion having a projecting outside portion for operating the same and its bearing portion arranged inside of the disk to form one part of the inner V-shaped bearing-groove, a ring portion in such hanger having its bearing portion arranged inside of the disk completing the V-shaped bearing-groove, and a series of antifriction-balls in such bearing, substantially as described.

EMILE AZE.

Witnesses:
 THOMAS F. SHERIDAN,
 THOMAS B. MCGREGOR.